(12) United States Patent
Muramatsu

(10) Patent No.: US 7,554,745 B2
(45) Date of Patent: Jun. 30, 2009

(54) ZOOM LENS EMPLOYING LENS ECCENTRICITY APPROACH TO COMPENSATE FOR IMAGE BLUR DUE TO HAND TREMOR

(75) Inventor: Yuichi Muramatsu, Saitama (JP)

(73) Assignee: Tamron Co., Ltd., Saitama-shi, Saitama (JP)

( * ) Notice: Subject to any disclaimer, the term of this patent is extended or adjusted under 35 U.S.C. 154(b) by 0 days.

(21) Appl. No.: 12/071,969

(22) Filed: Feb. 28, 2008

(65) Prior Publication Data

US 2009/0015939 A1 Jan. 15, 2009

(30) Foreign Application Priority Data

Mar. 1, 2007 (JP) ............................. 2007-051817

(51) Int. Cl.
*G02B 15/14* (2006.01)
(52) U.S. Cl. ....................... 359/687; 359/686
(58) Field of Classification Search ................ 359/676, 359/686, 687; 348/240.99–240.3
See application file for complete search history.

(56) References Cited

U.S. PATENT DOCUMENTS

2003/0053210 A1 3/2003 Shinohara

FOREIGN PATENT DOCUMENTS

| JP | 09230235 | 9/1997 |
|---|---|---|
| JP | 2002-098895 | 4/2002 |
| JP | 2006-085155 | 3/2006 |

*Primary Examiner*—Darryl J Collins
(74) *Attorney, Agent, or Firm*—Jacobson Holman PLLC

(57) ABSTRACT

Zoom lens, using lens eccentricity to compensate for image blur, has four groups of lens pieces; $1^{st}$, $3^{rd}$ and $4^{th}$, each with positive refractive power, and $2^{nd}$ with negative refractive power, arranged in series on "closer to a subject first" basis. Moving from wide to telephoto causes $1^{st}$ and $2^{nd}$ groups to separate from each other, $2^{nd}$ and $3^{rd}$ groups to come closer to each other, and $3^{rd}$ and $4^{th}$ groups to come closer to each other. The leading subset of the $4^{th}$ group is closest to the subject, includes lens elements of positive and negative refractive power cemented together, and serves as an anti-tremor shift lens. The zoom lens satisfies the follows:

$1.45 < f41/fw < 1.8$ where f41 is a focal length of the leading subset in the 4th lens group, and fw is a focal length of the lens optics as a whole in the wide-angle mode.

3 Claims, 14 Drawing Sheets

FIG.3
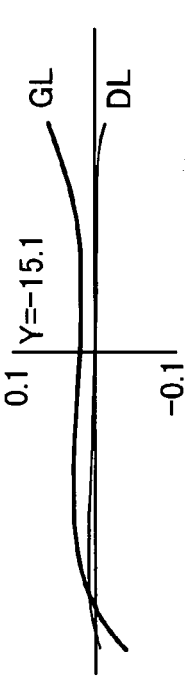
(A) WITHOUT TREMOR Y=0.0
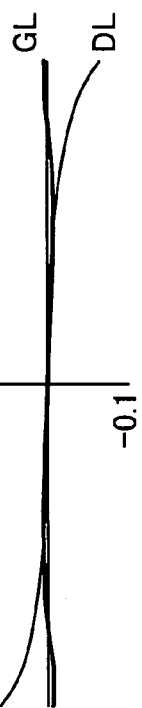
(B) WITHOUT TREMOR Y=10.8
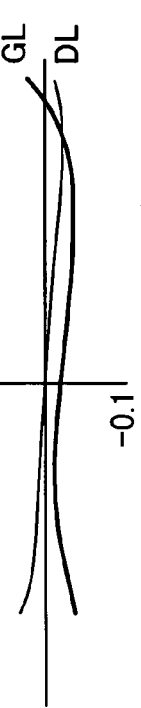
(C) WITHOUT TREMOR Y=15.1
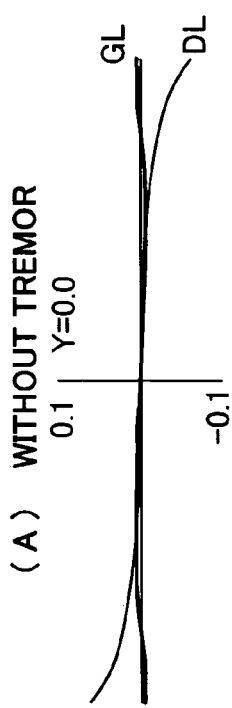
(E) WITH TREMOR Y=-15.1
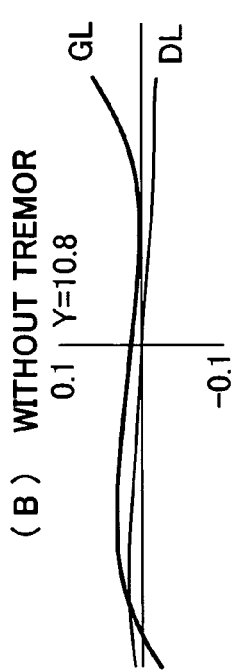
(F) WITH TREMOR Y=0.0
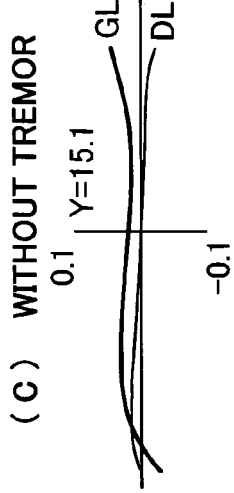
(G) WITH TREMOR Y=15.1
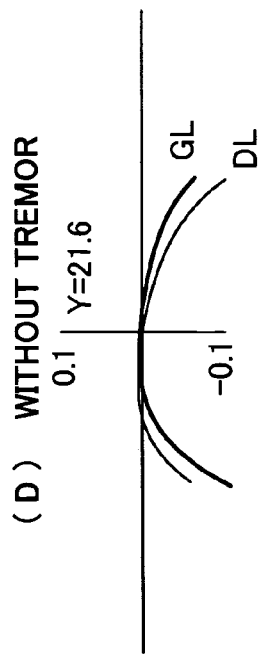
(D) WITHOUT TREMOR Y=21.6

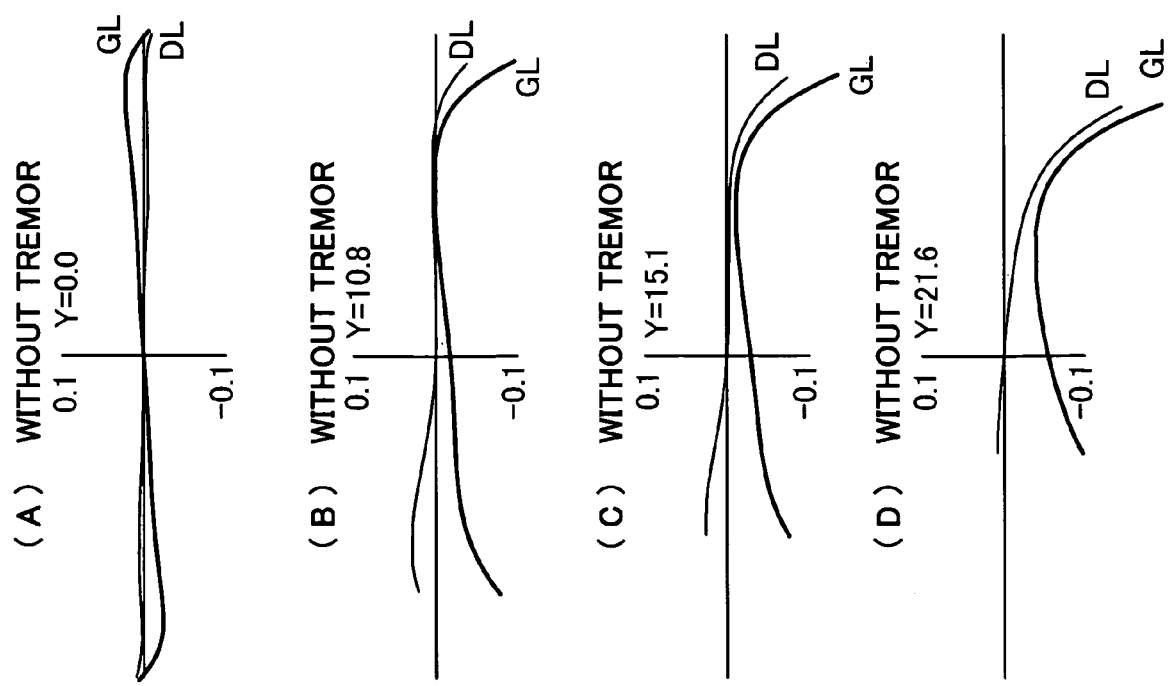

ZOOM LENS EMPLOYING LENS ECCENTRICITY APPROACH TO COMPENSATE FOR IMAGE BLUR DUE TO HAND TREMOR

FIELD OF THE INVENTION

The present invention relates to a high magnification power zoom lens that is used for single-lens reflex cameras, digital cameras, and the like, and that deviate a lens element in an abaxial manner to compensate for an image blur due to a tremor of the hand of a photographer. More particularly, the present invention relates to a compact, light-weight, and high magnification power zoom lens that is more than 75 degrees in coverage angle, approximately 6 to 7 in F number in the telephoto view mode, and approximately 10× in magnification power, and that is capable of compensating for an image blue caused by a tremor of the photographer's hand.

Drastic development and advancement of the optical design technology and the optics manufacturing technology for recent years have accelerated downsizing and enhancement of magnification power of zoom lenses. Some types of the zoom lenses, which incorporate four groups of lens elements that exert positive, negative, positive and positive refractive powers, respectively, have successfully enhanced a magnification power up to on the order of ten times as high as their predecessor models (see Patent Document 1 listed below).

Some other types of the zoom lenses have been developed and proposed which have a feature of shifting part of the optics perpendicularly to the optical axis to compensate for an image blur caused by a tremor of the hand of a photographer although compact and of high magnification power (see Patent Documents 2, 3 and 4 listed below). Still other types of the zoom lenses employ an optics design where part of a lens group, which is immediately behind another lens with an aperture stop located therein (i.e., right on the rear side the lens, closer to an image plane) and, is eccentrically moved from the remaining lens groups to compensate for an image blur caused by the hand tremor, resulting in ensuring a space in which a shutter-driving motor is built in around an aperture stop.

Patent Document 1
Japanese Unexamined Patent Publication No. 2003-241097
Patent Document 2
Japanese Unexamined Patent Publication No. 2005-107280
Patent Document 3
Japanese Unexamined Patent Publication No. 2006-106191
Patent Document 4
Japanese Unexamined Patent Publication No. H09-230237

A high magnification power zoom lens as disclosed in the Patent Document 1, which is approximately 75 degrees in photo-shooting coverage angle in the prior art wide-angle view mode and as high as 10× in magnification power ratio, is structurally unsatisfactory to deviate a lens element in an abaxial manner and compensate for an image blur caused by the hand tremor. That is because the prior art zoom lens has its imaging precision deteriorated not to fit to be used in practice as a result of an abaxial deviation as small as 0.01 mm of the lens element although, in general, the abaxial deviation of the lens element has to be as much as 0.5 mm to 1.01 mm to make the zoom lens in the telephoto view mode conduct the anti-hand-tremor compensation feature.

In a lens optics as disclosed in the Patent Documents 2 and 3 that has an anti-hand-tremor feature, a lens element to eccentrically move for regulating the imaging is located in the vicinity of an aperture stop, and there is not a sufficient space to attach a lens actuator and a shutter-driving device around the aperture stop.

A zoom lens as disclosed in the Patent Document 4 similarly with an anti-hand-tremor feature takes an approach where part of a lens group, which is immediately behind another lens group with an aperture stop located therein (i.e., right on the rear side of the lens group, closer to an image plane), is eccentrically moved from the remaining lens groups to compensate for an image blur caused by the hand tremor. The zoom lens, although it ensures a sufficient space to attach a shutter-driving motor around an aperture stop, still provides an insufficient adaxial clearance filled with air on either the eyepiece side or the nosepiece side of a lens element to deviate in an abaxial manner, resulting in no sufficient space available for an attachment of an actuator to eccentrically move the lens element.

Further, in the zoom lens with an anti-hand-tremor feature as disclosed in the Patent Document 4, the lens element to eccentrically move to avoid an image blur caused by the hand tremor is not a composite lens of more than one lens elements cemented together, and therefore, an abaxial deviation of the lens element causes significant chromatic aberration of magnification. For this reason, this approach is not suitable for the close-up photographing in the telephoto view mode.

The present invention is made to overcome the aforementioned disadvantages in the prior art zoom lenses, and accordingly, it is an object of the present invention to provide a zoom lens employing a lens eccentricity approach to compensate for an image blur due to the hand tremor where, in the telephoto view mode, an abaxial deviation as much as 0.5 mm to 1 mm of a lens element would not deteriorate the imaging precision so much as not to fit to be used in practice.

Another object of the present invention is to provide a zoom lens employing a lens eccentricity approach to compensate for an image blur due to the hand tremor where an anti-hand-tremor feature is based on an abaxial deviation of a lens element, and the lens element to eccentrically move is located apart from an aperture stop so that there is a sufficient space to attach an actuator for the lens element and a shutter-driving device.

Still another object of the present invention is to provide a zoom lens employing a lens eccentricity approach to compensate for an image blur due to the hand tremor where part of a lens group, which is immediately behind another lens group with an aperture stop located therein (i.e., right on the rear side of the lens group, closer to an image plane), is eccentrically moved from the remaining lens groups to compensate for an image blur caused by the hand tremor, resulting in ensuring a space to attach a shutter-driving motor around the aperture stop and ensuring a sufficient adaxial clearance filled with air on either the eyepiece side or the nosepiece side of a lens element to deviate in an abaxial manner so that there is a sufficient space available for an attachment of an actuator to eccentrically move the lens element.

Further another object of the present invention is to provide a zoom lens employing a lens eccentricity approach to compensate for an image blur due to the hand tremor where a lens element to eccentrically move to avoid an image blur caused by the hand tremor is a composite lens of more than one lens elements cemented together, so that an abaxial deviation of the lens element would not cause significant chromatic aberration of magnification, and that a zooming ratio can be raised to be suitable for the close-up photographing in the telephoto view mode.

SUMMARY OF THE INVENTION

The present invention provides a zoom lens employing a lens eccentricity approach to compensate for an image blur, for example, due to a tremor of the hand of a photographer. The zoom lens has four groups of lens pieces, namely, the 1st lens group of positive refractive power, the 2nd lens group of negative refractive power, the 3rd lens group of positive refractive power, and the 4th lens group of positive refractive power arranged in series on the "closer to a subject first" basis, and varying a magnification power from the wide angle view to the telephoto view causes the 1st and 2nd lens groups to separate from each other, the 2nd and 3rd lens groups to come closer to each other, and the 3rd and 4th lens groups to come closer to each other. The 4th lens group has the leading subset of lens pieces of positive refractivity closest to the subject, and the leading subset includes a composite lens that has a lens element of positive refractive power and a lens element of negative refractive power cemented together. The leading subset of lens pieces serves as an anti-tremor shift lens that is deviated in almost perpendicular to an axial direction to compensate for an image blur caused by a tremor of the photographer's hand. The zoom lens satisfies the optical requirements as follows:

$$1.45 < f41/fw < 1.8 \quad (1)$$

where f41 is a focal length of the leading subset of lens pieces in the 4th lens group, and fw is a focal length of the lens optics as a whole in the wide-angle view mode.

In this specification, the equivalent to a lens, which has a surface shaped and coated to work as a lens, is referred to as "lens."

The present invention is exemplified in various manners as mentioned below.

In an aspect of the present invention, the zoom lens employing a lens eccentricity approach to compensate for an image blur due to the hand tremor satisfies the optical requirements as follows:

$$0.25 < f1/ft < 0.55 \quad (2)$$

$$0.10 < f4/ft < 0.38 \quad (3)$$

$$0.03 < D4a/ft < 0.10 \quad (4)$$

where f1 is a focal length of the 1st lens group, f4 is a focal length of the 4th lens group, ft is a focal length of the lens optics as a whole in the telephoto view mode, and D4a is a distance from an aperture stop to a lens surface closer to the subject of the foremost lens piece belonging to the leading subset in the 4th lens group.

In another aspect of the present invention, the leading subset of lens pieces in the 4th lens group, which serves as an anti-tremor shift lens, is located in the foremost position closest to the subject among the remaining subsets of the 4th lens group, and an adaxial clearance filled with air is provided between the anti-tremor shift lens and a lens piece immediately behind the same (i.e., right on the rear side of the anti-tremor shift lens, closer to an image plane), meeting the requirement as follows:

$$1.0 < D4b \quad (5)$$

where D4b is an adaxial clearance filled with air between the anti-tremor shift lens and the lens piece immediately behind the same.

The zoom lens according to the present invention can have its lens element abaxially deviated as much as 0.5 mm to 1 mm in the telephoto view mode without deteriorating the imaging precision so much as it is not to fit to be used in practice, and such a lens eccentricity approach is effective in compensating for an image blur due to the hand tremor.

Further, the zoom lens according to the present invention has an anti-hand-tremor feature that is based on an abaxial deviation of a lens element, and the lens element to eccentrically move is located apart from an aperture stop so that there is a sufficient space to attach an actuator for the lens element and a shutter-driving device.

Moreover, in the zoom lens according to the present invention, part of a lens group, which is immediately behind another lens group with an aperture stop located therein (i.e., right on the rear side of the lens group, closer to an image plane), is eccentrically moved from the remaining lens groups to compensate for an image blur caused by the hand tremor, resulting in ensuring a space available to attach a shutter-driving motor around the aperture stop and ensuring a sufficient adaxial clearance filled with air on either the eyepiece side or the nosepiece side of a lens element to deviate in an abaxial manner so that there is a sufficient space to attach an actuator to eccentrically move the lens element.

Furthermore, in the zoom lens according to the present invention, a lens element to eccentrically move to avoid an image blur caused by the hand tremor is a composite lens of more than one lens elements cemented together, so that an abaxial deviation of the lens element would not cause significant chromatic aberration of magnification, and that a zooming ratio can be raised to be suitable for the close-up photographing in the telephoto view mode.

<Description of the Requirements for the Optics Design>

The zoom lens according to the present invention has four groups of lens pieces, namely, the 1st lens group of positive refractive power, the 2nd lens group of negative refractive power, the 3rd lens group of positive refractive power, and the 4th lens group of positive refractive power arranged in series on the "closer to a subject first" basis. In order to ensure a sufficient space to attach an actuator to eccentrically move a lens element, the lens element is the leading subset of lens pieces closest to the subject among the remaining subsets in the 4th lens group.

The formula (1) defines a rate of the focal length of the leading subset in the 4th lens group to that of the zoom lens in the wide-angle view mode. When f41/fw exceeds the lower limit as defined in the formula (1), the abaxial deviation of the leading subset required for compensation against the hand tremor is advantageously reduced, but instead, such abaxial deviation increasingly causes aberration, which brings about difficulties in retaining the imaging precision. When f41/fw exceeds the upper limit, the abaxial deviation of the leading subset required for compensation against the hand tremor is increased. For this reason, the leading subset must accordingly have an increased diameter, and the actuator to eccentrically move the lens element should be increased in size.

The formula (2) defines a rate of the focal length of the 1st lens group to that of the zoom lens in the telephoto view mode. When f1/ft exceeds the lower limit as defined in the formula (2), the resultant reduction in the focal length of the 1st lens group is advantageous for downsizing the lens optics as a whole, but instead, such a reduction causes difficulties in compensating for spherical aberration and comatic aberration when the zoom lens is in the telephoto view mode. When f1/ft exceeds the lower limit as defined in the formula (2), the resultant increase in the focal length of the 1st lens group causes the 1st lens group to be displaced accordingly longer to ensure the focal length of the zoom lens in the telephoto view mode, and to cope with this, a cam mechanism should be complicated in structure, which inevitably leads to an increase in radial dimensions of the zoom lens. In the telephoto view mode, the 1st lens group is farther away from the aperture stop, and beams come to pass through the 1st lens group in its peripheral area, which also causes difficulties in compensating for comatic aberration.

The formula (3) defines a rate of the focal length of the 4th lens group to that of the zoom lens in the telephoto view mode. When f4/ft exceeds the lower limit as defined in the formula (3), the resultant reduction in the focal length of the 4th lens group is advantageous for downsizing the lens optics as a whole, but instead, such a reduction causes difficulties in ensuring a sufficient back focus as well as exaggerating effects of the aberration caused by the anti-tremor shift lens deviated in perpendicularly abaxial directions, which degrades the imaging precision more. When f4/ft exceeds the upper limit as defined in the formula (3), the resultant increase in the focal length of the 4th lens group causes the 4th lens group to be displaced accordingly longer at a varied magnification power, and this is disadvantageous for downsizing the lens optics as a whole. In addition, it is inevitable that an effective diameter of the 4th lens group is greater, which causes difficulties in ensuring a sufficient amount of light in its peripheral area.

The formula (4) defines a rate of a distance between the aperture stop and the anti-tremor shift lens to the focal length of the zoom lens in the telephoto view mode. When D4a/ft exceeds the lower limit as defined in the formula (4), it is hard to build all the required components in the restricted zone since the aperture stop and the anti-tremor shift lens come closer to each other to such an extent that there is no longer a sufficient space between the shutter-driving device in the vicinity of the aperture stop and the actuator to drive the anti-tremor shift lens. When D4a/ft exceeds the upper limit, the aperture stop and the anti-tremor shift lens are farther away from each other, and part of the lens optics behind the aperture stop (on the rear side closer to an image plane) has its entire extension elongated. Abaxial light flux, as it comes farther away from the aperture stop, passes points farther away from the optical axis, and therefore, the part of the lens optics behind the aperture stop must be greater in effective diameter, which results in an increase in weight of the anti-tremor shift lens.

The formula (5) defines a distance between the anti-tremor lens and the lens piece immediately behind the same. When D4b exceeds the lower limit, there is no longer available space in the vicinity of the anti-tremor shift lens, and it is hard to attach therearound the actuator to drive the anti-tremor shift lens.

BRIEF DESCRIPTION OF THE DRAWINGS

FIG. 3 illustrates various types of aberration caused in the exemplary zoom lens in the wide-angle-view infinity mode after compensation for an image blur due to the hand tremor.

FIG. 14 illustrates various types of aberration caused in the exemplary zoom lens in the telephoto-view infinity mode after compensation for an image blur due to the hand tremor.

DETAILED DESCRIPTION OF THE BEST MODE

EMBODIMENT 1

Figure 1:
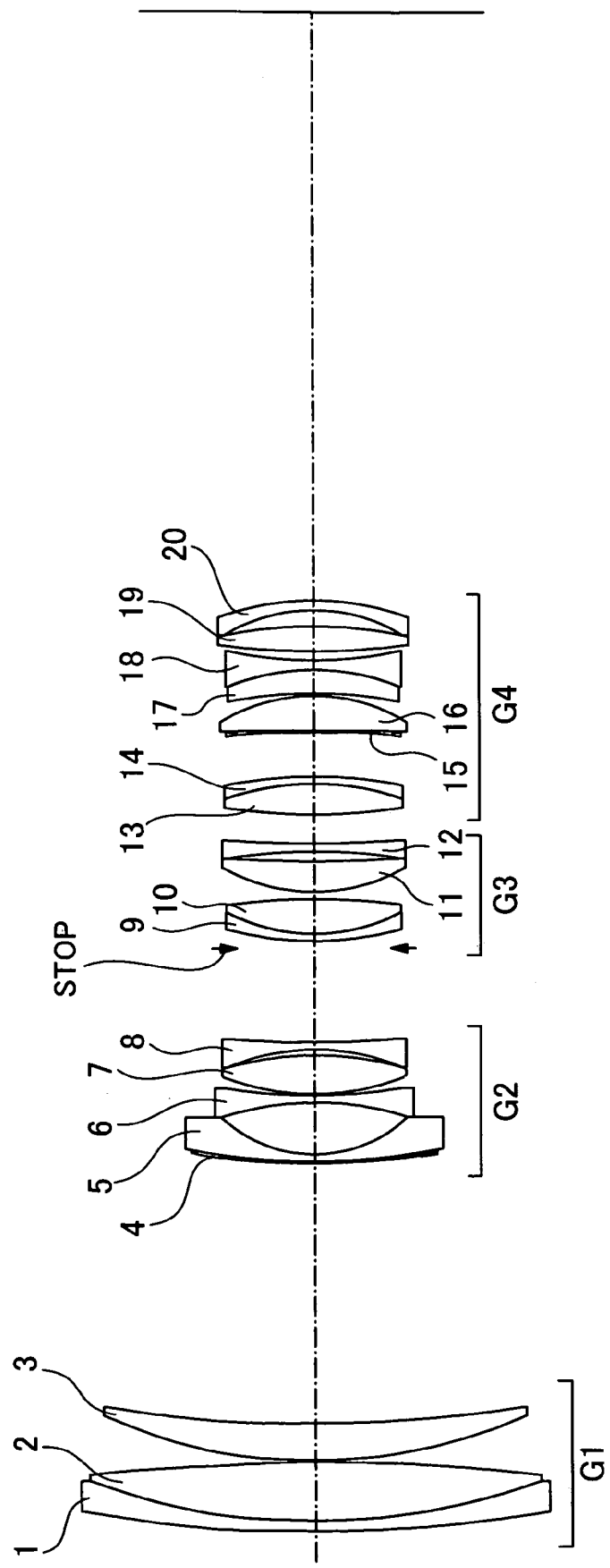
FIG. 1 is a sectional view of an embodiment of a zoom lens according to the present invention that employs a lens eccentricity approach to compensate for an image blur due to a tremor of the hand of a photographer, showing the zoom lens in the wide-angle view mode.

As cross-sectionally shown in FIG. 1, an embodiment of a zoom lens of the present invention, which employs a lens eccentricity approach to compensate for an image blur due to a tremor of the hand of a photographer, is comprised of twenty lens pieces, namely, the 1st lens element 1 to the 20th lens element 20. They work in four groups, namely, the 1st lens group to the 4th lens group, and the 1st lens group G1 has the 1st lens element 1 to the 3rd lens element 3. The 2nd lens group G2 has the 4th lens element 4 to the 8th lens element 8. The 3rd lens group G3 has the 9th lens element 9 to the 12th lens element 12. The 4th lens group G4 has the 13th lens element 13 to the 20th lens element 20. The 13th lens element 13 and the 14th lens element 14 in the lens group G4 are cemented together into a single composite lens that is to be eccentrically moved from the remaining lens pieces for the anti-tremor compensation.

In the following lookup table, f is a focal length (mm), Fno is an F number, and, $2\bar{\omega}$ is a coverage angle. Numerals in the first column of the table labeled with NO are surface numbers of the lens pieces, those in the second column designated by R are curvatures of radius (mm) corresponding to the surface numbers, corresponding lens thicknesses and clearances filled with air in the third column designated by D, corresponding refractivities for yellow light or d-line (wavelength $\lambda$=587.6 nm) in the fourth column labeled with Nd and Abbe's numbers in the fifth column vd. A coefficient "d" in the third column represents a clearance filled with air that is altered depending upon a variable magnification power. Reference symbol "STOP" denotes an aperture stop.

TABLE 1 f = 28.99~91.61~289.51 (in millimeters)
Fno = 3.66~5.33~6.3
2ω = 77.1~25.5~8.3 (in degrees)

| NO | R | D | Nd | vd |
|---|---|---|---|---|
| 1 | 166.5125 | 1.30 | 1.84666 | 23.78 |
| 2 | 78.6939 | 7.30 | 1.48700 | 81.61 |
| 3 | −233.3261 | 0.20 | 1.00000 | |
| 4 | 61.9641 | 4.60 | 1.77250 | 49.60 |
| 5 | 160.2757 | d5 | 1.00000 | |
| 6 | 102.5655 | 0.20 | 1.51460 | 49.96 |
| 7 | 78.0119 | 0.90 | 1.80400 | 46.58 |
| 8 | 16.4000 | 6.40 | 1.00000 | |
| 9 | −36.9946 | 0.90 | 1.69680 | 55.53 |
| 10 | 65.5333 | 0.15 | 1.00000 | 60.2 |
| 11 | 29.9526 | 4.80 | 1.84666 | 23.78 |
| 12 | −39.0649 | 0.70 | 1.00000 | |
| 13 | −27.0909 | 0.90 | 1.88300 | 40.78 |
| 14 | 117.0215 | d14 | 1.00000 | |
| 15 STOP | 0.0000 | 0.90 | 1.00000 | |
| 16 | 39.5000 | 0.90 | 1.80400 | 46.58 |
| 17 | 22.4863 | 4.30 | 1.58913 | 61.18 |
| 18 | −80.3480 | 0.90 | 1.00000 | |
| 19 | 22.1842 | 3.80 | 1.49700 | 81.61 |
| 20 | 178.0673 | 1.20 | 1.00000 | |
| 21 | −65.4914 | 1.00 | 1.88300 | 40.78 |
| 22 | 148.2243 | d22 | 1.00000 | |
| 23 | 65.0000 | 3.80 | 1.69350 | 53.23 |
| 24 | −32.5112 | 0.90 | 1.92286 | 20.88 |
| 25 | −52.9159 | 5.50 | 1.00000 | |
| 26 | −511.5897 | 0.20 | 1.51460 | 49.96 |
| 27 | −511.5897 | 4.30 | 1.53172 | 48.91 |
| 28 | −21.5188 | 0.30 | 1.00000 | |
| 29 | −52.9270 | 2.90 | 1.57501 | 41.49 |
| 30 | −27.5341 | 1.20 | 1.77250 | 49.60 |
| 31 | 48.9493 | 1.10 | 1.00000 | |
| 32 | 87.2169 | 3.10 | 1.53172 | 48.91 |
| 33 | −54.0989 | 2.00 | 1.00000 | |
| 34 | −20.7063 | 1.20 | 1.83481 | 42.72 |
| 35 | −33.6118 | BF | 1.00000 | |

Altered Clearance Depending upon Magnification Power

| f | 28.99 | 91.61 | 289.51 |
|---|---|---|---|
| d5 | 1.543 | 32.344 | 56.147 |
| d14 | 22.627 | 11.636 | 0.980 |
| d22 | 7.274 | 3.583 | 1.894 |
| BF | 41.351 | 72.703 | 89.947 |

The surfaces numbered by 6, 23, and 26 are aspherical surfaces. The aspherical surfaces can be expressed as follows:

$$x = \frac{H^2/r}{1 + \sqrt{1 - A(H/r)^2}} + A_4 H^4 + A_6 H^6 + A_8 H^8 + A_{10} H^{10} \quad (6)$$

Coefficients in the formula (6) are given as follows:

Coefficients of the Aspherical
$r^6$
A=1.0
A4=3.89526E-06
A6=−9.11352E-09
A8=3.38500E-11
A10=4.40130E-14
$r^{23}$
A=1.0
A4=−4.608486E-06
A6=−7.67367E-09
A8=34.41760E-11
A10=−2.08700E-13
$r^{26}$
A=1.0
A4=−2.96411E-05
A6=−3.43989E-08
A8=−2.43138E-10
A10=1.10665E-12

Values of the terms in the formulae related to the exemplary anti-tremor zoom lens are given as follows:

| Formulae | Terms | Values |
|---|---|---|
| (1) | f41/fw | 1.661 |
| (2) | f1/ft | 0.3273 |
| (3) | f4/ft | 0.2176 |
| (4) | D4a/ft | 0.0514 |
| (5) | D4b | 5.5 |

Figure 2:
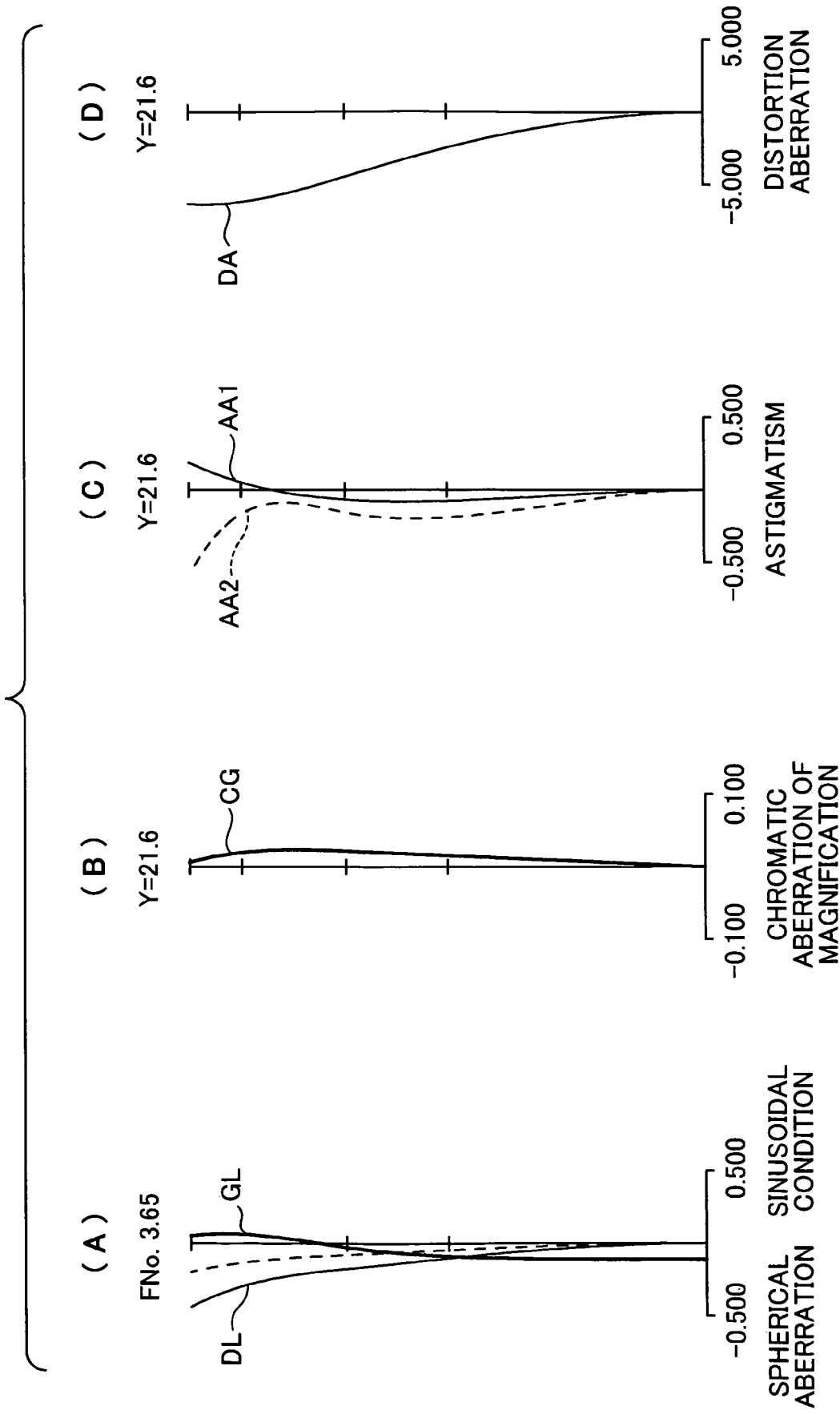
FIG. 2 illustrates various types of aberration caused in the exemplary zoom lens in the wide-angle-view infinity mode.

Spherical aberrations and sinusoidal conditions of the exemplary anti-tremor zoom lens in the wide-angle-view infinity mode are as shown in FIG. 2 (A) where Fno is an F number. Graph DL illustrates aberrations related to yellow light or d-line (587.56 nm). Graph GL illustrates the aberrations related to violet light or g-line (435.83 nm). The graph of broken line represents sinusoidal conditions.

Chromatic aberrations of magnification of the zoom lens in the wide-angle-view infinity mode are as shown in FIG. 2 (B). An image height Y is 21.6 mm. Graph CG illustrates chromatic aberrations of magnification related to the g-line (435.83 nm) in contrast with the d-line (587.56 nm).

Astigmatisms of the zoom lens in the wide-angle-view infinity mode are as shown in FIG. 2 (C). The image height Y is 21.6 mm. Solid line AA1 represents sagittal directions of the d-line (587.56 nm) while broken line AA2 depicts meridional direction of the d-line (587.56 nm).

Distortion aberrations of the zoom lens in the wide-angle-view infinity mode are as shown in FIG. 2 (D). The image height Y is 21.6 mm. Solid line DA represents the distortion aberrations related to the d-line (587.56 nm).

FIG. 3 depicts variations in the aberrations caused in the exemplary anti-tremor zoom lens when the 13th and 14th lens elements cemented together in a single composite lens are eccentrically moved, that is, they are deviated in abaxial directions perpendicular to the optical axis. FIG. 3 (A) illustrates spherical aberrations when the image height is 0.0 mm without a tremor of the hand. FIG. 3 (B) depicts spherical aberrations when the image height is 10.8 mm without hand tremor. FIG. 3 (C) shows spherical aberrations when the image height is 15.1 mm without hand tremor. FIG. 3 (D) illustrates spherical aberrations when the image height is 21.6 mm without hand tremor. FIG. 3 (E) illustrates spherical aberrations when the image height is −15.1 mm with hand tremor. FIG. 3 (F) depicts spherical aberrations when the image height is 0.0 mm with the hand tremorring. FIG. 3 (G) depicts spherical aberrations when the image height is 15.1 mm with hand tremor.

Figure 4:
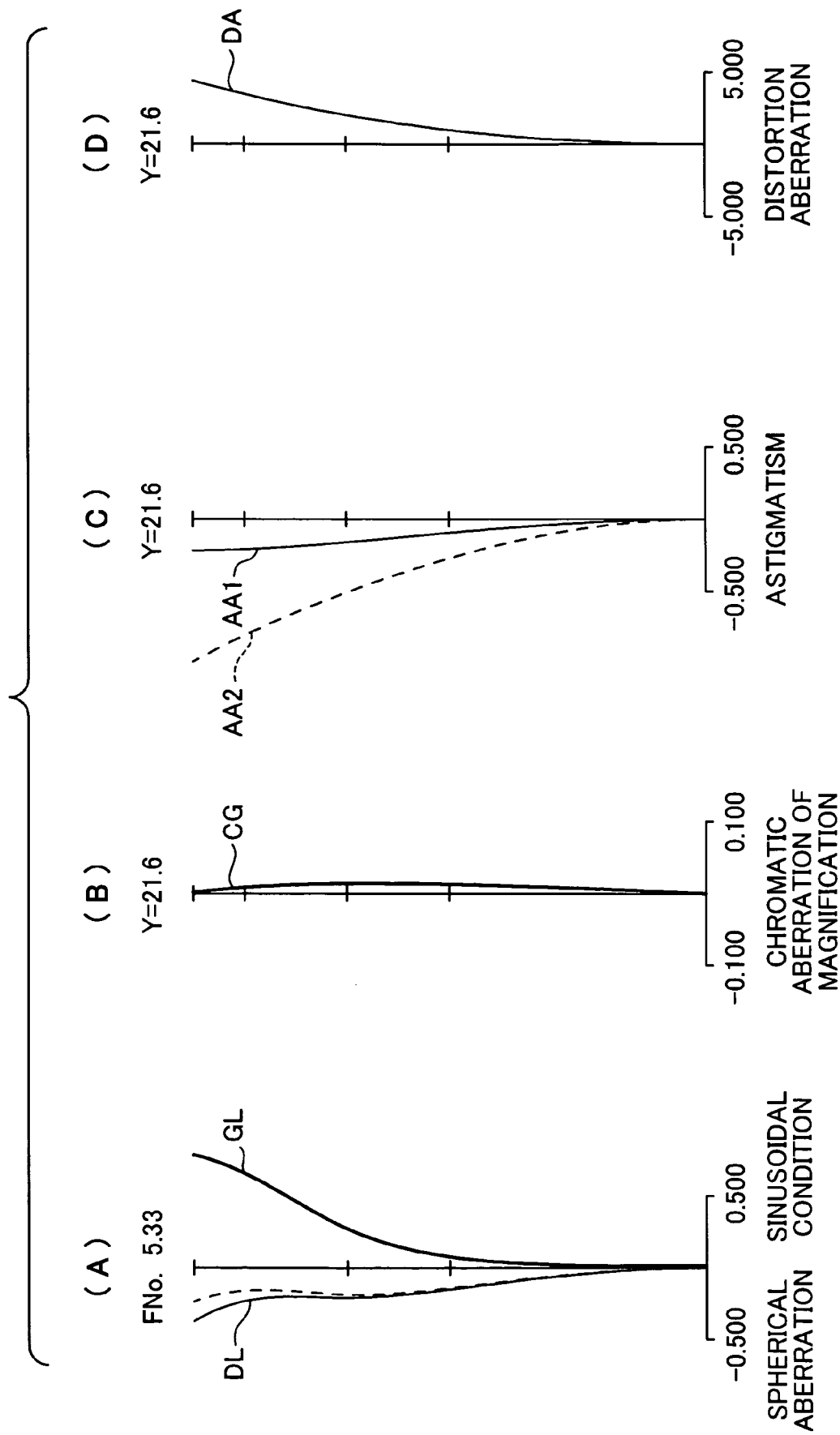
FIG. 4 illustrates various types of aberration caused in the exemplary zoom lens in the intermediate-zooming-range infinity mode.

Spherical aberrations and sinusoidal conditions of the exemplary anti-tremor zoom lens in the intermediate-zooming-range infinity mode are as shown in FIG. 4 (A) where Fno denotes an F number. Graph DL illustrates aberrations related to the d-line (587.56 nm). Graph GL illustrates the aberrations related to the g-line (435.83 nm). The graph of broken line represents sinusoidal conditions.

Chromatic aberrations of magnification of the zoom lens in the intermediate-zooming-range infinity mode are as shown in FIG. 4 (B). The image height Y is 21.6 mm. CG represents the chromatic aberrations of magnification related to the g-line (435.83 nm) in contrast with the d-line (587.56 nm).

Astigmatisms of the zoom lens in the intermediate-zooming-range infinity mode are as shown in FIG. 4 (C). The image height Y is 21.6 mm. Solid line AA1 represents sagittal directions of the d-line (587.56 nm) while broken line AA2 depicts meridional directions of the d-line (587.56 nm).

Distortion aberrations of the zoom lens in the intermediate-zooming-range infinity mode are as shown in FIG. 4 (D). The image height Y is 21.6 mm. Solid line DA represents the distortion aberrations related to the d-line (587.56 nm).

Depicting ways of the aberration graphs in FIGS. 4 (A) to (D) are the same as those of FIGS. 2 (A) to (D).

Figure 5:
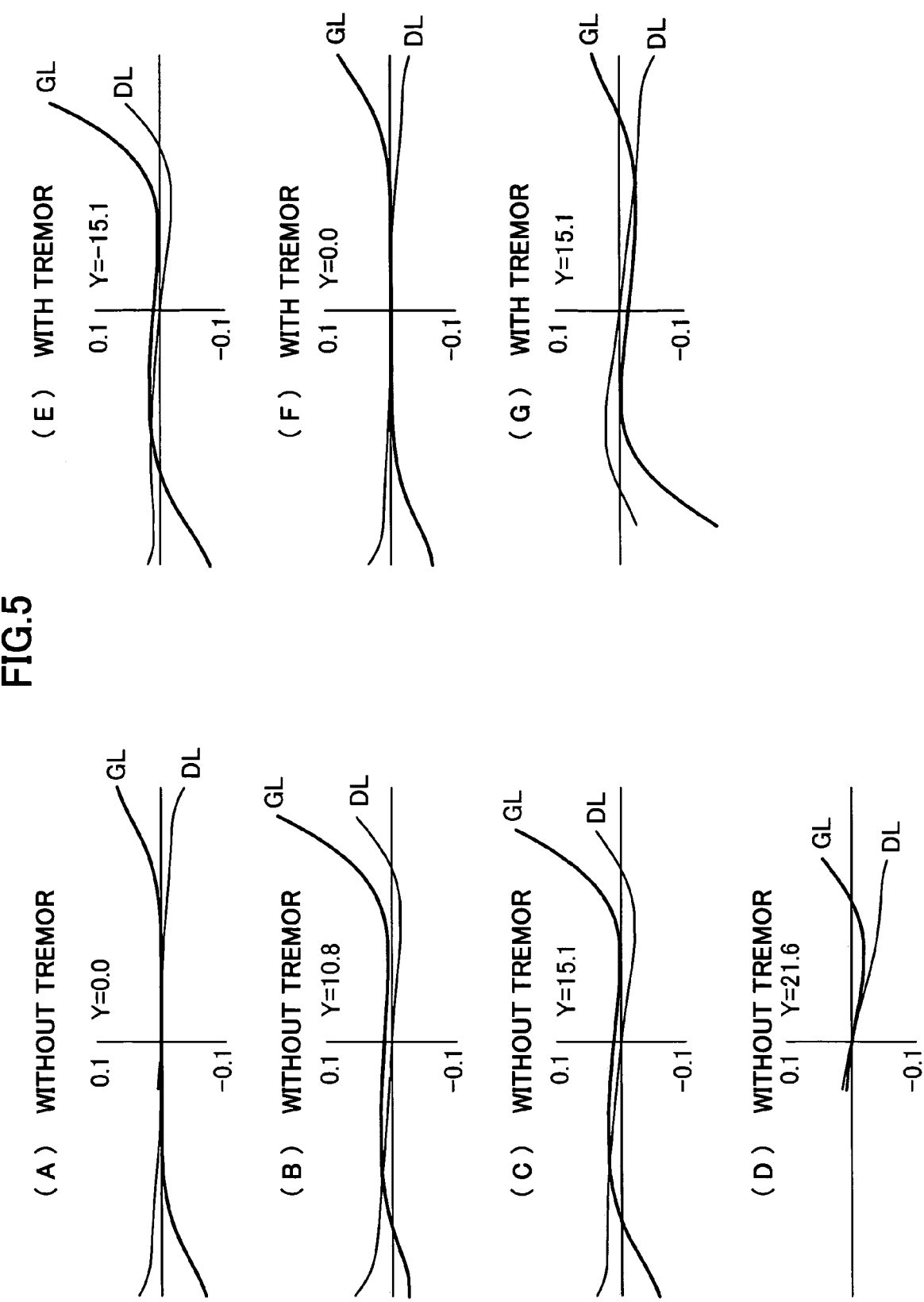
FIG. 5 illustrates various types of aberration caused in the exemplary zoom lens in the intermediate-zooming-range infinity mode after compensation for an image blur due to the hand tremor.

FIG. 5 depicts variations in the aberrations caused in the exemplary anti-tremor zoom lens when the 13th and 14th lens pieces cemented together in a single composite lens are eccentrically moved, that is, they are deviated in abaxial directions perpendicular to the optical axis. FIG. 5 (A) illustrates spherical aberrations when the image height is 0.0 mm without a tremor of the hand. FIG. 5 (B) depicts spherical aberrations when the image height is 10.8 mm without hand tremor. FIG. 5 (C) shows spherical aberrations when the image height is 15.1 mm without hand tremor. FIG. 5 (D) illustrates spherical aberrations when the image height is 21.6 mm without hand tremor. FIG. 5 (E) illustrates spherical aberrations when the image height is −15.1 mm with hand tremor. FIG. 5 (F) depicts spherical aberrations when the image height is 0.0 mm with hand tremor. FIG. 5 (G) depicts spherical aberrations when the image height is 15.1 mm with hand tremor.

Depicting ways of the aberration graphs in FIGS. 5 (A) to (G) are the same as those of FIGS. 3 (A) to (G).

Figure 6:
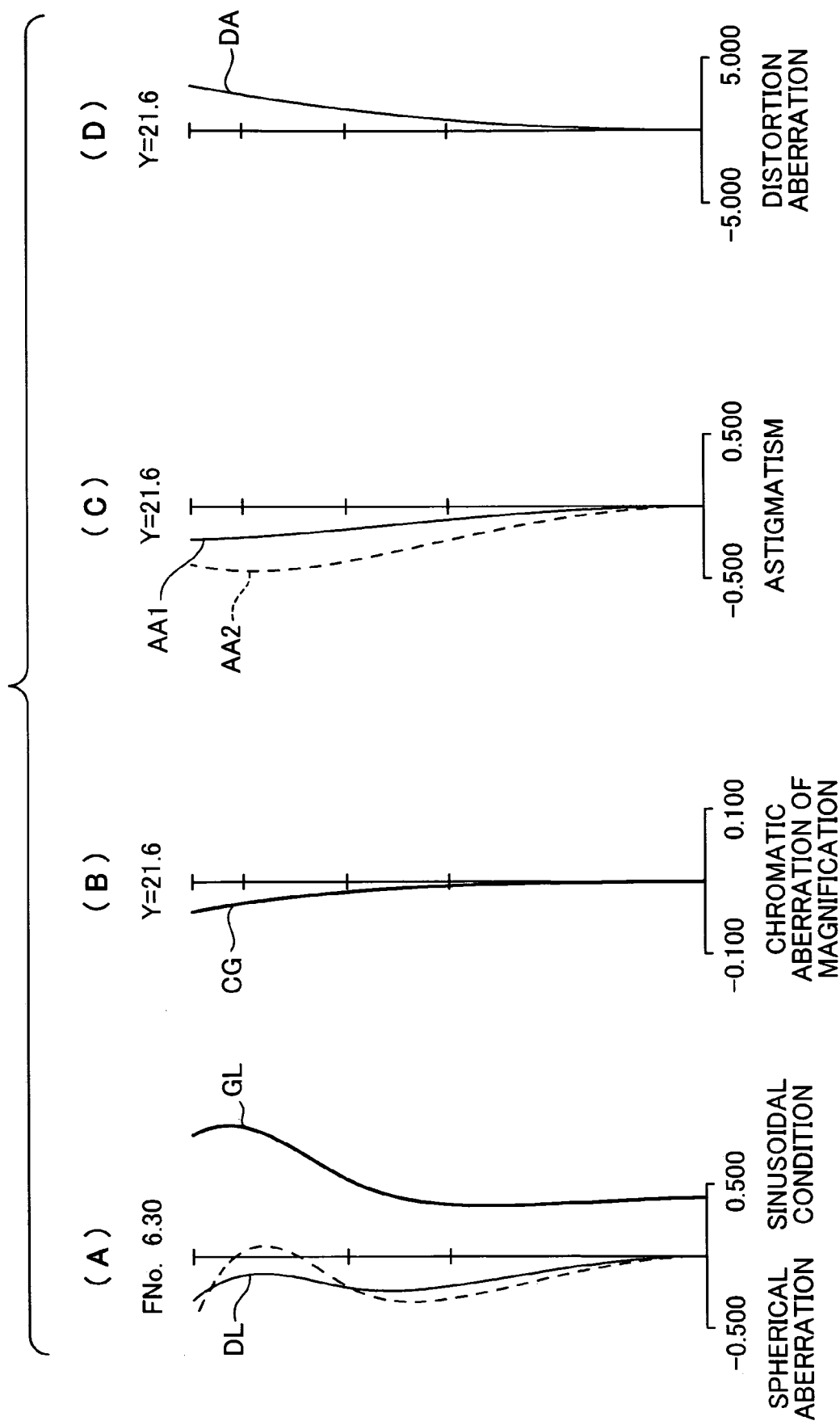
FIG. 6 illustrates various types of aberration caused in the exemplary zoom lens in the telephoto-view infinity mode.

Spherical aberrations and sinusoidal conditions of the exemplary anti-tremor zoom lens in the telephoto-view infinity mode are as shown in FIG. 6 (A) where Fno denotes an F number. Graph DL illustrates aberrations related to the d-line (587.56 nm). Graph GL illustrates the aberrations related to the g-line (435.83 nm). The graph of broken line represents sinusoidal conditions.

Chromatic aberrations of magnification of the zoom lens in the telephoto-view infinity mode are as shown in FIG. 6 (B). The image height Y is 21.6 mm. CG represents the chromatic aberrations of magnification related to the g-line (435.83 nm) in contrast with the d-line (587.56 nm).

Astigmatisms of the zoom lens in the telephoto-view infinity mode are as shown in FIG. 6 (C). The image height Y is 21.6 mm. Solid line AA1 represents sagittal directions of the d-line (587.56 nm) while broken line AA2 depicts meridional directions of the d-line (587.56 nm).

Distortion aberrations of the zoom lens in the telephoto-view infinity mode are as shown in FIG. 6 (D). The image height Y is 21.6 mm. Solid line DA represents the distortion aberrations related to the d-line (587.56 nm).

Depicting ways of the aberration graphs in FIGS. 6 (A) to (D) are the same as those of FIGS. 2 (A) to (D).

Figure 7:
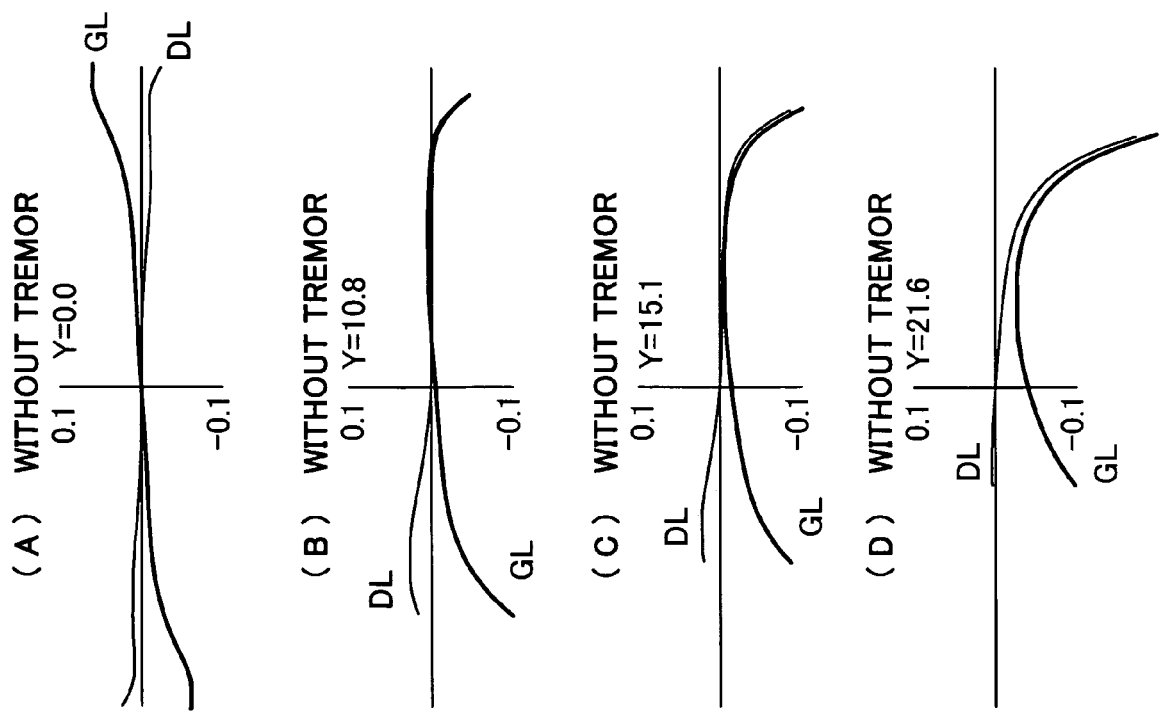
FIG. 7 illustrates various types of aberration caused in the exemplary zoom lens in the telephoto-view infinity mode after compensation for an image blur due to the hand tremor.
Figure 8:
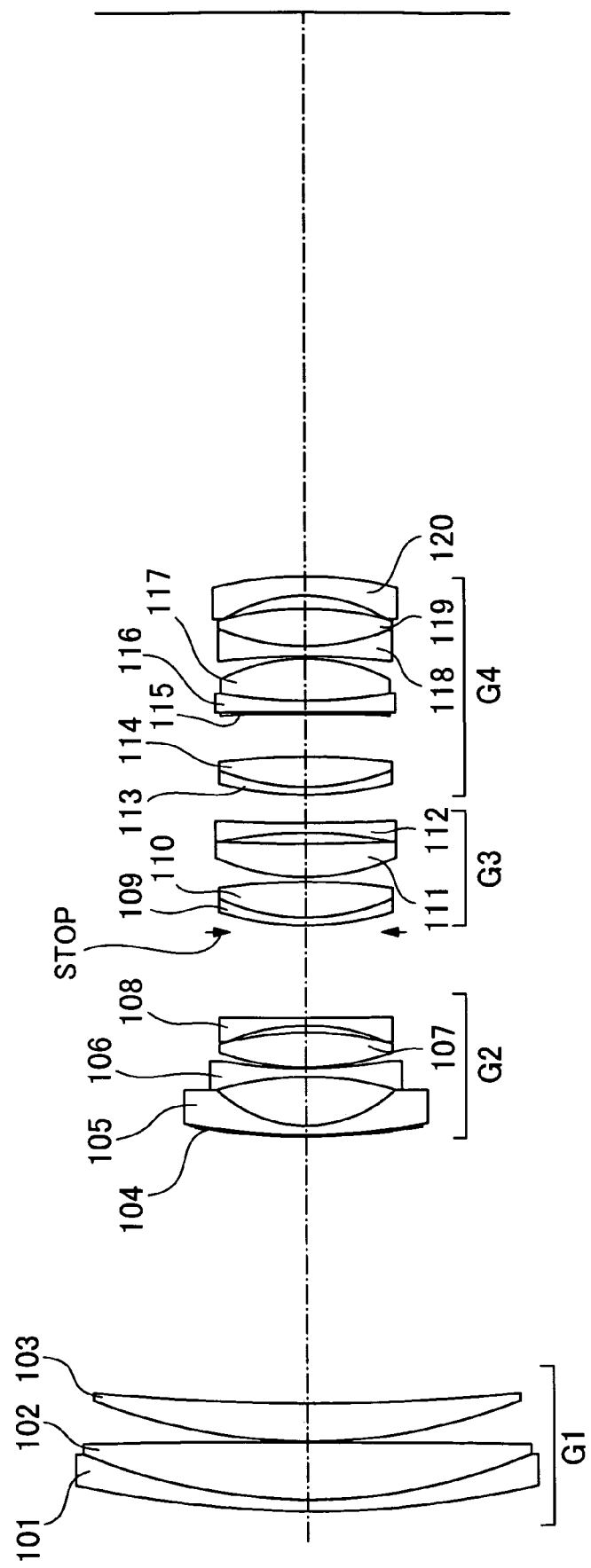
FIG. 8 is a sectional view of another embodiment of the zoom lens according to the present invention that employs a lens eccentricity approach to compensate for an image blur due to tremor of the hand of a photographer, showing the zoom lens in the wide-angle view mode.

FIG. 7 depicts variations in the aberrations caused in the exemplary anti-tremor zoom lens when the 13th and 14th lens pieces cemented together in a single composite lens are eccentrically moved, that is, they are deviated in abaxial directions perpendicular to the optical axis. FIG. 7 (A) illustrates spherical aberrations when the image height is 0.0 mm without a tremor of the hand. FIG. 7 (B) depicts spherical aberrations when the image height is 10.8 mm without hand tremor. FIG. 7 (C) shows spherical aberrations when the image height is 15.1 mm without hand tremor. FIG. 7 (D) illustrates spherical aberrations when the image height is 21.6 mm without hand tremor. FIG. 7 (E) illustrates spherical aberrations when the image height is −15.1 mm with hand tremor. FIG. 7 (F) depicts spherical aberrations when the image height is 0.0 mm with hand tremor. FIG. 7 (G) depicts spherical aberrations when the image height is 15.1 mm with hand tremor.

Depicting ways of the aberration graphs in FIGS. 7 (A) to (G) are the same as those of FIGS. 3 (A) to (G).

EMBODIMENT 2

As cross-sectionally shown in FIG. 81, another embodiment of the zoom lens of the present invention, which employs a lens eccentricity approach to compensate for an image blur due to a tremor of the hand of a photographer, is comprised of twenty lens pieces, namely, the 1st lens element 101 to the 20th lens element 120. They work in four groups, namely, the 1st lens group to the 4th lens group, and the 1st lens group G1 has the 1st lens element 101 to the 3rd lens element 103. The 2nd lens group G2 has the 4th lens element 104 to the 8th lens element 108. The 3rd lens group G3 has the 9th lens element 109 to the 12th lens element 112. The 4th lens group G4 has the 13th lens element 113 to the 20th lens element 120. The 13th lens element 113 and the 14th lens element 114 in the 4th lens group G4 are cemented together into a single composite lens that is to be eccentrically moved from the remaining lens pieces for the anti-tremor compensation.

The following lookup table (Table 2) is identical with Table 1.

TABLE 2 f = 28.99~91.61~289.54 (in millimeters)
Fno = 3.53~5.27~6.3
$2\overline{\omega}$ = 77.7~25.6~8.3 (in degrees)

| NO | R | D | Nd | vd |
|---|---|---|---|---|
| 1 | 135.0000 | 1.50 | 1.84666 | 23.78 |
| 2 | 72.2534 | 7.40 | 1.49700 | 81.61 |
| 3 | −1290.7614 | 0.10 | 1.00000 | |
| 4 | 72.7711 | 4.90 | 1.77250 | 49.60 |
| 5 | 287.5758 | d5 | 1.00000 | |
| 6 | 91.7956 | 0.20 | 1.51460 | 49.96 |
| 7 | 82.0000 | 1.20 | 1.83481 | 42.72 |
| 8 | 16.4500 | 6.30 | 1.00000 | |
| 9 | −38.9238 | 1.10 | 1.77250 | 49.60 |
| 10 | 64.2763 | 0.10 | 1.00000 | |
| 11 | 32.9540 | 4.50 | 1.84666 | 23.78 |
| 12 | −41.9315 | 0.90 | 1.00000 | |
| 13 | −25.1284 | 1.00 | 1.77250 | 49.60 |
| 14 | 743.9100 | d14 | 1.00000 | |
| 15 STOP | 0.0000 | 0.90 | 1.00000 | |
| 16 | 37.1982 | 1.00 | 1.83400 | 37.17 |
| 17 | 26.1910 | 4.60 | 1.61800 | 63.39 |
| 18 | −78.2158 | 0.60 | 1.00000 | |
| 19 | 27.5882 | 4.30 | 1.49700 | 81.61 |
| 20 | 216.5342 | 1.40 | 1.00000 | |
| 21 | −51.7822 | 1.30 | 1.88300 | 40.78 |
| 22 | 260.2108 | d22 | 1.00000 | |
| 23 | 44.2660 | 1.00 | 1.92286 | 20.88 |
| 24 | 29.6000 | 3.90 | 1.69350 | 53.23 |
| 25 | −77.9258 | 5.50 | 1.00000 | |
| 26 | −3000.0000 | 0.20 | 1.51460 | 49.96 |
| 27 | −3000.0000 | 1.50 | 1.77250 | 49.60 |
| 28 | 63.7819 | 5.40 | 1.54072 | 47.23 |
| 29 | −22.9703 | 0.30 | 1.00000 | |
| 30 | −87.7973 | 1.30 | 1.77250 | 49.60 |

TABLE 2-continued f = 28.99~91.61~289.54 (in millimeters)
Fno = 3.53~5.27~6.3
$2\overline{\omega}$ = 77.7~25.6~8.3 (in degrees)

| NO | R | D | Nd | νd |
|---|---|---|---|---|
| 31 | 28.2287 | 4.80 | 1.54072 | 47.23 |
| 32 | −41.2573 | 1.70 | 1.00000 | |
| 33 | −19.1542 | 2.50 | 1.83481 | 42.72 |
| 34 | −46.7948 | BF | 1.00000 | |

Altered Clearance Depending upon Magnification Power

| f | 28.99 | 91.61 | 289.54 |
|---|---|---|---|
| d5 | 1.750 | 34.328 | 61.032 |
| d14 | 22.180 | 11.022 | 0.968 |
| d22 | 7.498 | 3.612 | 1.896 |
| BF | 39.574 | 72.286 | 90.641 |

The surfaces numbered by 6, 23, and 26 are aspherical surfaces. Coefficients in the formula (6) are given below.

Coefficients of the Aspherical
$r^6$
A=1.0
A4=4.36963E-06
A6=−7.20856E-09
A8=1.45746E-11
A10=1.17628E-13
$r^{25}$
A=1.0
A4=6.24383E-06
A6=−2.40863E-10
A8=−5.24981E-11
A10=3.16970E-13
$r^{26}$
A=1.0
A4=−1.72117E-05
A6=−2.50797E-08
A8=−1.05788E-10
A10=6.33261E-13

Values of the terms in the formulae related to the exemplary anti-tremor zoom lens are given as follows:

| Formulae | Terms | Values |
|---|---|---|
| (1) | f41/fw | 1.589 |
| (2) | f1/ft | 0.3539 |
| (3) | f4/ft | 0.2044 |
| (4) | D4a/ft | 0.0552 |
| (5) | D4b | 5.5 |

Figure 9:
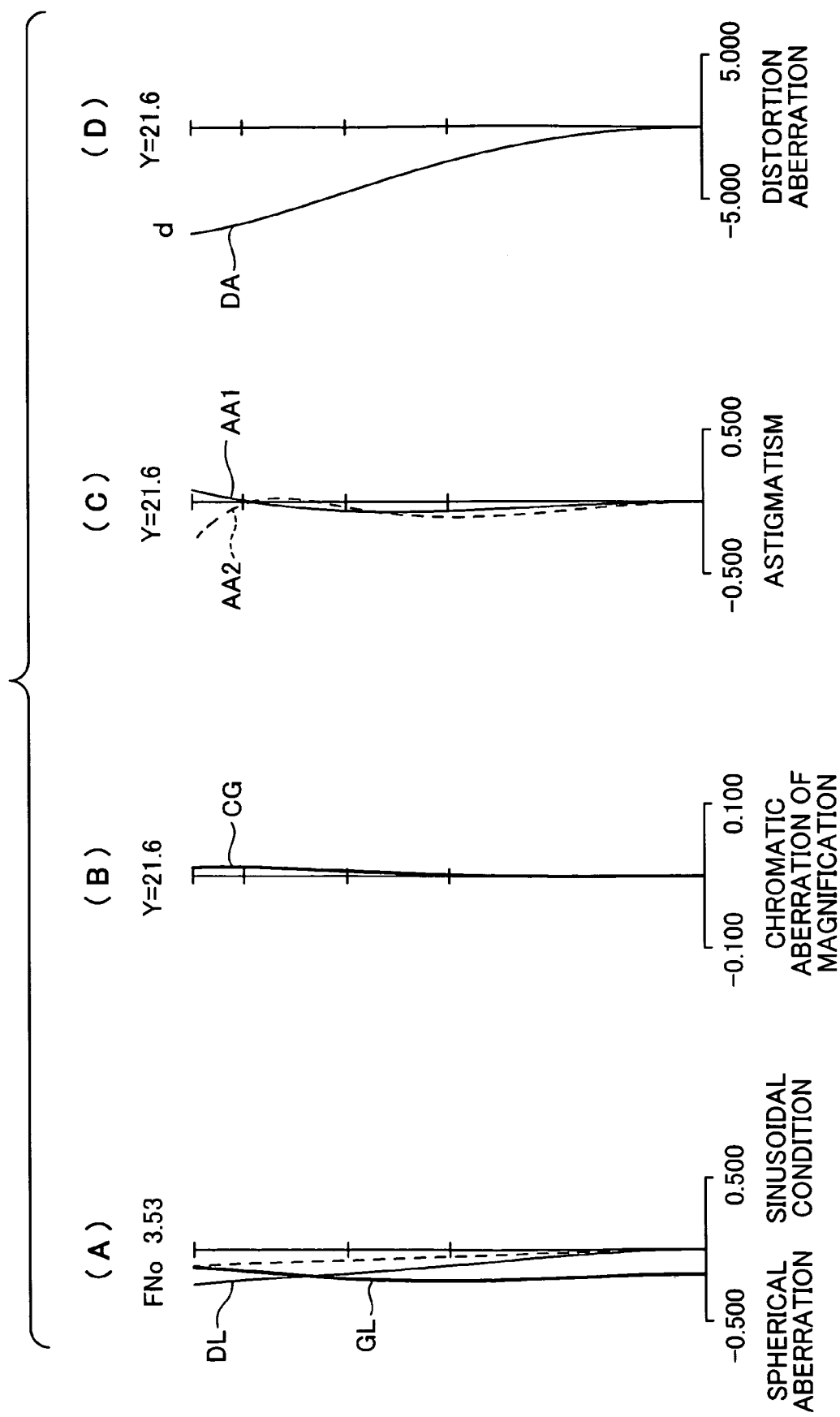
FIG. 9 illustrates various types of aberration caused in the exemplary zoom lens in the wide-angle-view infinity mode.

Spherical aberrations and sinusoidal conditions of the exemplary anti-tremor zoom lens in the wide-angle-view infinity mode are as shown in FIG. 9 (A) where Fno is an F number. Graph DL illustrates aberrations related to the d-line (587.56 nm). Graph GL illustrates the aberrations related to the g-line (435.83 nm). The graph of broken line represents sinusoidal conditions.

Chromatic aberrations of magnification of the zoom lens in the wide-angle-view infinity mode are as shown in FIG. 9 (B). An image height Y is 21.6 mm. Graph CG illustrates chromatic aberrations of magnification related to the g-line (435.83 nm) in contrast with the d-line (587.56 nm).

Astigmatisms of the zoom lens in the wide-angle-view infinity mode are as shown in FIG. 9 (C). The image height Y is 21.6 mm. Solid line AA1 represents sagittal directions of the d-line (587.56 nm) while broken line AA2 depicts meridional direction of the d-line (587.56 nm).

Distortion aberrations of the zoom lens in the wide-angle-view infinity mode are as shown in FIG. 9 (D). The image height Y is 21.6 mm. Solid line DA represents the distortion aberrations related to the d-line (587.56 nm).

Figure 10:
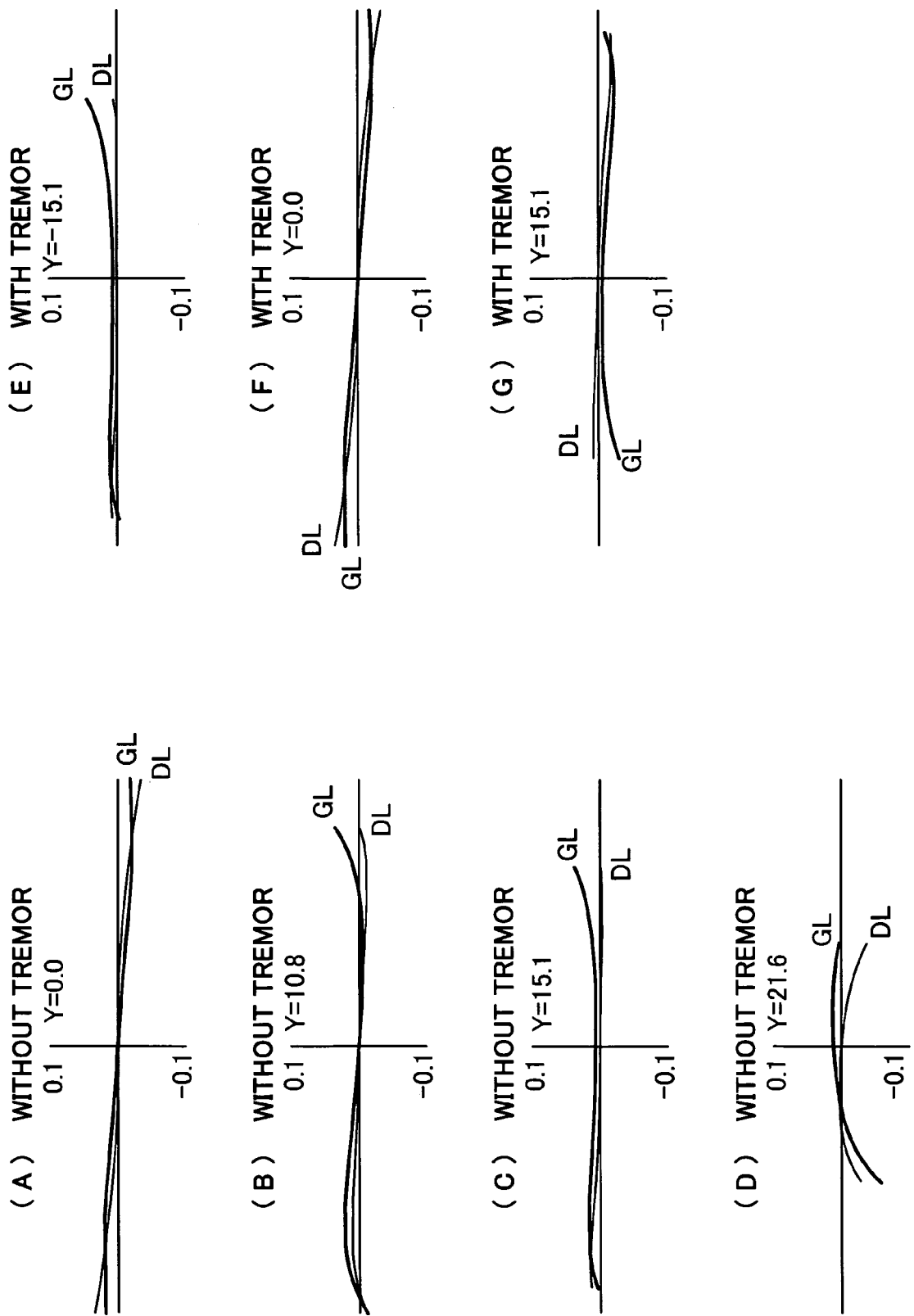
FIG. 10 illustrates various types of aberration caused in the exemplary zoom lens in the wide-angle-view infinity mode after compensation for an image blur due to the hand tremor.

FIG. 10 depicts variations in the aberrations caused in the exemplary anti-tremor zoom lens when the 13th lens piece 113 and the 14th lens piece 114 cemented together in a single composite lens are eccentrically moved, that is, they are deviated in abaxial directions perpendicular to the optical axis. FIG. 10 (A) illustrates spherical aberrations when the image height is 0.0 mm without a tremor of the hand. FIG. 10 (B) depicts spherical aberrations when the image height is 10.8 mm without hand tremor. FIG. 10 (C) shows spherical aberrations when the image height is 15.1 mm without hand tremor. FIG. 10 (D) illustrates spherical aberrations when the image height is 21.6 mm without hand tremor. FIG. 10 (E) illustrates spherical aberrations when the image height is −15.1 mm with hand tremor. FIG. 10 (F) depicts spherical aberrations when the image height is 0.0 mm with hand tremor. FIG. 10 (G) depicts spherical aberrations when the image height is 15.1 mm with hand tremor.

Figure 11:
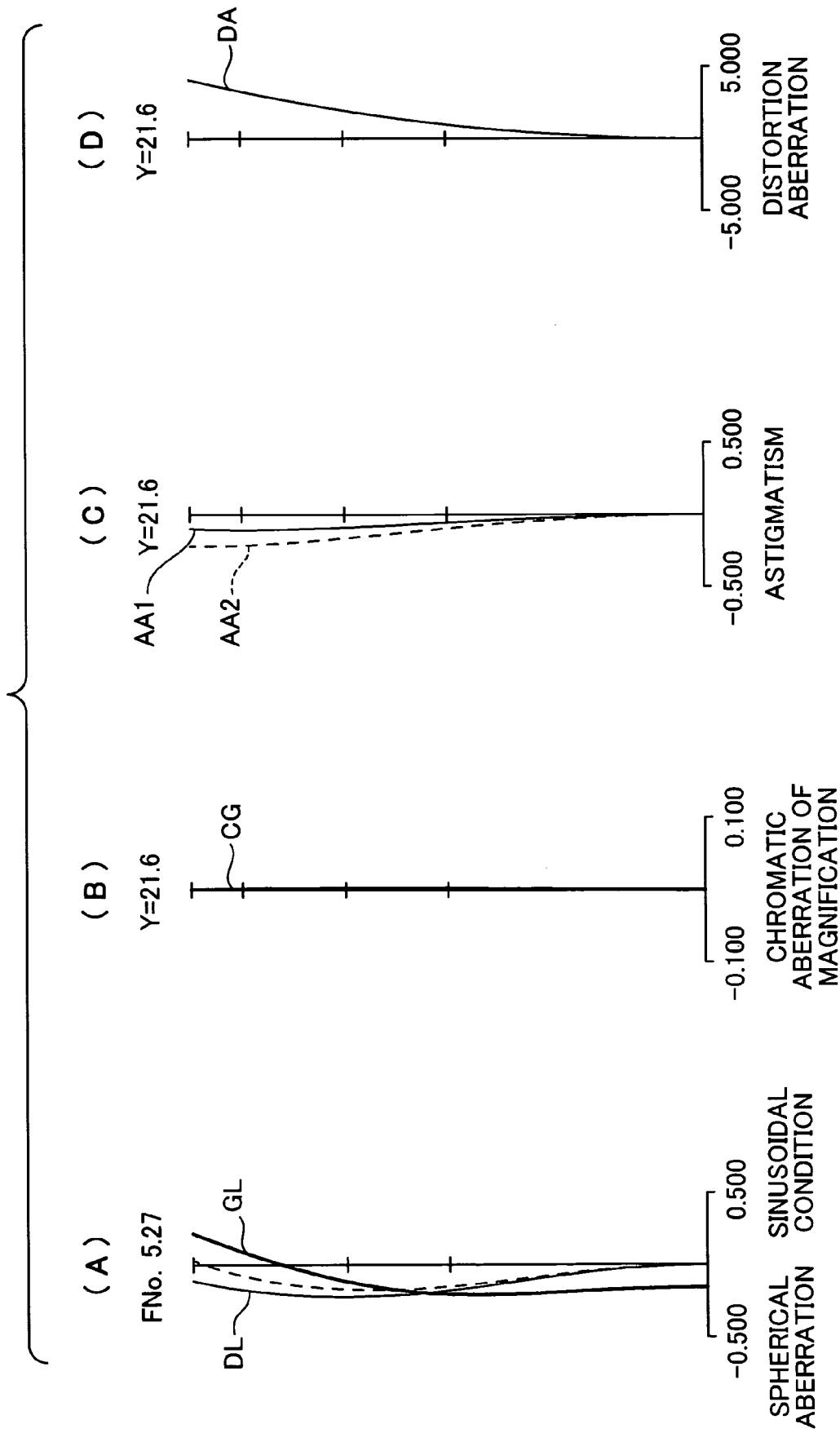
FIG. 11 illustrates various types of aberration caused in the exemplary zoom lens in the intermediate-zooming-range infinity mode.

Spherical aberrations and sinusoidal conditions of the exemplary anti-tremor zoom lens in the intermediate-zooming-range infinity mode are as shown in FIG. 11 (A) where Fno denotes an F number. Graph DL illustrates aberrations related to the d-line (587.56 nm). Graph GL illustrates the aberrations related to the g-line (435.83 nm). The graph of broken line represents sinusoidal conditions.

Chromatic aberrations of magnification of the zoom lens in the intermediate-zooming-range infinity mode are as shown in FIG. 11 (B). The image height Y is 21.6 mm. CG represents the chromatic aberrations of magnification related to the g-line (435.83 nm) in contrast with the d-line (587.56 nm).

Astigmatisms of the zoom lens in the intermediate-zooming-range infinity mode are as shown in FIG. 11 (C). The image height Y is 21.6 mm. Solid line AA1 represents sagittal directions of the d-line (587.56 nm) while broken line AA2 depicts meridional directions of the d-line (587.56 nm).

Distortion aberrations of the zoom lens in the intermediate-zooming-range infinity mode are as shown in FIG. 11 (D). The image height Y is 21.6 mm. Solid line DA represents the distortion aberrations related to the d-line (587.56 nm).

Depicting ways of the aberration graphs in FIGS. 11 (A) to (D) are the same as those of FIGS. 9 (A) to (D).

Figure 12:
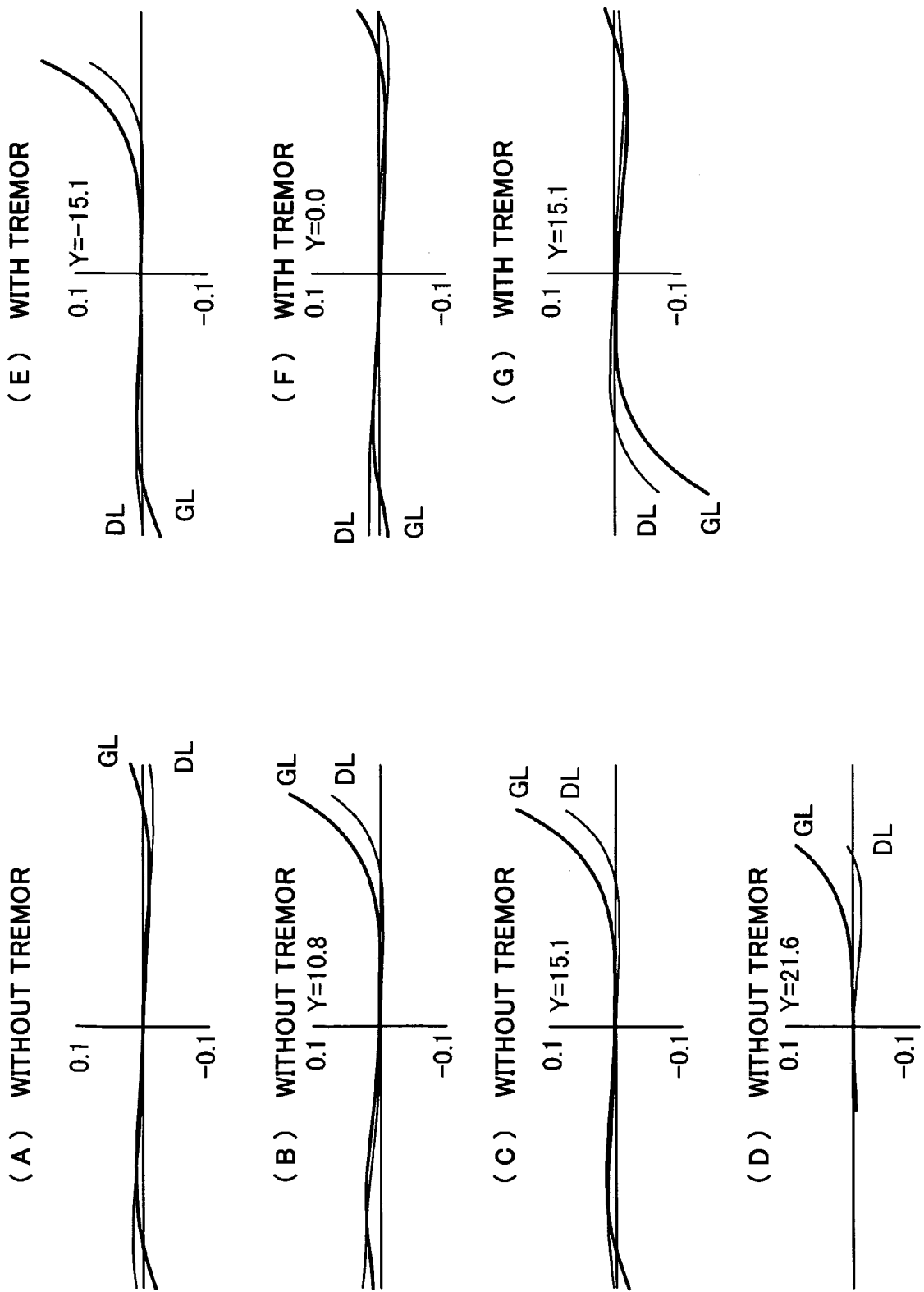
FIG. 12 illustrates various types of aberration caused in the exemplary zoom lens in the intermediate-zooming-range infinity mode after compensation for an image blur due to the hand tremor.

FIG. 12 depicts variations in the aberrations caused in the exemplary anti-tremor zoom lens when the 13th lens piece 113 and the 14th lens piece 114 cemented together in a single composite lens are eccentrically moved, that is, they are deviated in abaxial directions perpendicular to the optical axis. FIG. 12 (A) illustrates spherical aberrations when the image height is 0.0 mm without a tremor of the hand. FIG. 12 (B) depicts spherical aberrations when the image height is 10.8 mm without hand tremor. FIG. 12 (C) shows spherical aberrations when the image height is 15.1 mm without hand tremor. FIG. 12 (D) illustrates spherical aberrations when the image height is 21.6 mm without hand tremor. FIG. 12 (E) illustrates spherical aberrations when the image height is −15.1 mm with hand tremor. FIG. 12 (F) depicts spherical aberrations when the image height is 0.0 mm with hand tremor. FIG. 12 (G) depicts spherical aberrations when the image height is 15.1 mm with hand tremor.

Depicting ways of the aberration graphs in FIGS. 12 (A) to (G) are the same as those of FIGS. 10 (A) to (G).

Figure 13:
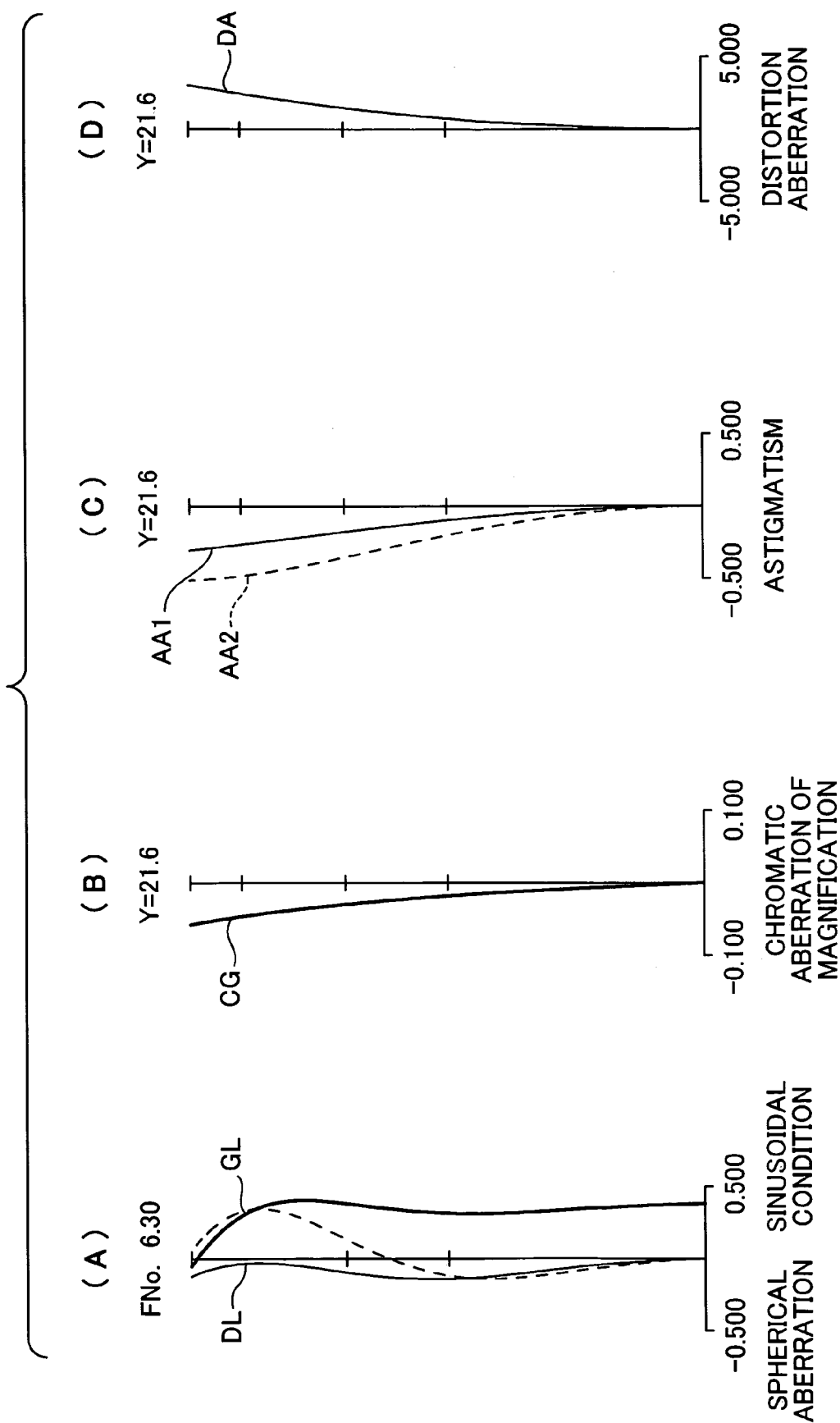
FIG. 13 illustrates various types of aberration caused in the exemplary zoom lens in the telephoto-view infinity mode.

Spherical aberrations and sinusoidal conditions of the exemplary anti-tremor zoom lens in the telephoto-view infinity mode are as shown in FIG. 13 (A) where Fno denotes an F number. Graph DL illustrates aberrations related to the d-line (587.56 nm). Graph GL illustrates the aberrations related to the g-line (435.83 nm). The graph of broken line represents sinusoidal conditions.

Chromatic aberrations of magnification of the zoom lens in the telephoto-view infinity mode are as shown in FIG. 13 (B). The image height Y is 21.6 mm. CG represents the chromatic aberrations of magnification related to the g-line (435.83 nm) in contrast with the d-line (587.56 nm).

Astigmatisms of the zoom lens in the telephoto-view infinity mode are as shown in FIG. 13 (C). The image height Y is 21.6 mm. Solid line AA1 represents sagittal directions of the d-line (587.56 nm) while broken line AA2 depicts meridional directions of the d-line (587.56 nm).

Distortion aberrations of the zoom lens in the telephoto-view infinity mode are as shown in FIG. 13 (D). The image height Y is 21.6 mm. Solid line DA represents the distortion aberrations related to the d-line (587.56 nm).

Depicting ways of the aberration graphs in FIGS. 13 (A) to (D) are the same as those of FIGS. 9 (A) to (D).

FIG. 14 depicts variations in the aberrations caused in the exemplary anti-tremor zoom lens when the 13th lens piece 113 and the 14th lens piece 114 cemented together in a single composite lens are eccentrically moved, that is, they are deviated in abaxial directions perpendicular to the optical axis. FIG. 14 (A) illustrates spherical aberrations when the image height is 0.0 mm without a tremor of the hand. FIG. 14 (B) depicts spherical aberrations when the image height is 10.8 mm without hand tremor. FIG. 14 (C) shows spherical aberrations when the image height is 15.1 mm without hand tremor. FIG. 14 (D) illustrates spherical aberrations when the image height is 21.6 mm without hand tremor. FIG. 14 (E) illustrates spherical aberrations when the image height is −15.1 mm with hand tremor. FIG. 14 (F) depicts spherical aberrations when the image height is 0.0 mm with hand tremor. FIG. 14 (G) depicts spherical aberrations when the image height is 15.1 mm with hand tremor.

Depicting ways of the aberration graphs in FIGS. 14 (A) to (G) are the same as those of FIGS. 10 (A) to (G).

The anti-hand-tremor zoom lens as described in the context of the Embodiment 1 and Embodiment 2, provided with the 1st lens group of refractivity appropriately admeasured and allocated, could avoid increasing in an extension of the lens optics as a whole even in the telephoto view mode for the macro-photographing at 10× magnification power, and could successfully compensate for the spherical and comatic aberrations.

The zoom lens, provided with the 4th lens group of refractivity appropriately admeasured and allocated, could inhibit the aberrations from varying due to an eccentric movement of the lens element in the 4th lens group, and it could also inhibit the aberrations from varying due to a deviation of the anti-tremor shift lens perpendicular to the optical axis.

The zoom lens, provided with the 4th lens group of refractivity appropriately admeasured and allocated, could ensure a sufficient back focus and a sufficient distance between the aperture stop and the 4th lens group to avoid increasing an effective diameter of the 4th lens group.

The zoom lens, provided with an anti-tremor subset of lens pieces in the 4th lens group of refractivity appropriately admeasured and allocated, could reduce an amount by which the subset of lens pieces are to be eccentrically moved from the remaining lens pieces to compensate for an image blur due to a tremor of the photographer's hand, and it could also inhibit degradation of the imaging precision due to such an eccentric movement of the anti-tremor subset of lens pieces.

The zoom lens, provided with a composite lens of a positive refractivity lens piece and a negative refractivity lens piece cemented together as a member of an anti-tremor subset of lens pieces in the 4th lens group, could inhibit degradation of the imaging precision due to chromatic aberrations caused by an eccentric movement of the composite lens from the remaining lens pieces.

What is claimed is:

1. In a zoom lens that employs a lens eccentricity approach to compensate for an image blur and that has four groups of lens pieces, namely, the 1st lens group of positive refractive power, the 2nd lens group of negative refractive power, the 3rd lens group of positive refractive power, and the 4th lens group of positive refractive power arranged in series on the "closer to a subject first" basis, varying a magnification power from the wide angle view to the telephoto view causes the 1st and 2nd lens groups to separate from each other, the 2nd and 3rd lens groups to come closer to each other, and the 3rd and 4th lens groups to come closer to each other, the 4th lens group has the leading subset of lens pieces of positive refractivity closest to the subject, the leading subset including a composite lens that has a lens element of positive refractive power and a lens element of negative refractive power cemented together, the leading subset of lens pieces serving as an anti-tremor shift lens that is deviated in almost perpendicular to an axial direction to compensate for an image blur caused by a tremor of the photographer's hand, and the zoom lens satisfies the optical requirements as follows:

$$1.45 < f41/fw < 1.8 \tag{1}$$

where f41 is a focal length of the leading subset of lens pieces in the 4th lens group, and fw is a focal length of the lens optics as a whole in the wide-angle view mode.

2. A zoom lens according to claim 1, wherein the zoom lens satisfies optical requirements as follows:

$$0.25 < f1/ft < 0.55 \tag{2}$$

$$0.10 < f4/ft < 0.38 \tag{3}$$

$$0.03 < D4a/ft < 0.0 \tag{4}$$

where f1 is a focal length of the 1st lens group, f4 is a focal length of the 4th lens group, ft is a focal length of the lens optics as a whole in the telephoto view mode, and D4a is a distance from an aperture stop to a lens surface closer to the subject of the foremost lens piece belonging to the leading subset in the 4th lens group.

3. A zoom lens according to claim 1, wherein the leading subset of lens pieces in the 4th lens group, which serves as an anti-tremor shift lens, is located in the foremost position closest to the subject among the remaining subsets of the 4th lens group, and an adaxial clearance filled with air is provided between the anti-tremor shift lens and a lens piece immediately behind the same closer to an image plane, meeting the requirement as follows:

$$1.0 < D4b \tag{5}$$

where D4b is an adaxial clearance filled with air between the anti-tremor shift lens and the lens piece immediately behind the same.

* * * * *